(12) United States Patent
Sasai

(10) Patent No.: US 6,977,681 B1
(45) Date of Patent: Dec. 20, 2005

(54) IMAGE PROCESSING APPARATUS

(75) Inventor: Toshihiro Sasai, Kyoto (JP)

(73) Assignee: NuCORE Technology, Inc., Santa Clara, CA (US)

( * ) Notice: Subject to any disclaimer, the term of this patent is extended or adjusted under 35 U.S.C. 154(b) by 1090 days.

(21) Appl. No.: 09/655,665

(22) Filed: Sep. 6, 2000

(30) Foreign Application Priority Data

Sep. 10, 1999 (JP) ............................. 11/256928

(51) Int. Cl.[7] .................. H04N 5/217; H04N 9/64; G06K 9/40
(52) U.S. Cl. ................. 348/241; 348/246; 382/275
(58) Field of Search .................. 348/241, 246, 348/247; 382/275

(56) References Cited

U.S. PATENT DOCUMENTS

| | | | |
|---|---|---|---|
| 5,008,739 A | | 4/1991 | D'Luna et al. |
| 5,392,070 A | * | 2/1995 | Endo et al. .............. 348/247 |
| 5,805,216 A | | 9/1998 | Tabei et al. |
| 6,396,539 B1 | * | 5/2002 | Heller et al. ............. 348/246 |
| 6,642,960 B1 | * | 11/2003 | Kohashi et al. ......... 348/246 |
| 6,693,668 B1 | * | 2/2004 | May et al. ............... 348/247 |
| 6,724,945 B1 | * | 4/2004 | Yen et al. ............... 382/274 |

FOREIGN PATENT DOCUMENTS

EP 0 687 106 A1 12/1995

JP 1-170186 7/1989

* cited by examiner

*Primary Examiner*—Thai Tran
*Assistant Examiner*—Kelly Jerabek
(74) *Attorney, Agent, or Firm*—Townsend and Townsend and Crew LLP

(57) ABSTRACT

An image processing apparatus includes a replacement unit and interpolation unit. For the pixel value of a pixel that need not be replaced among pixel values contained in original image data, the replacement unit adds replacement information indicating non-replacement of the pixel value to the pixel value, and outputs the pixel value as replacement information-added image data. For the pixel value of a pixel that needs to be replaced, the replacement unit replaces the pixel value by a predetermined pixel value, adds replacement information indicating replacement of the pixel value to the replaced pixel value, and outputs the pixel value as replacement information-added image data. The interpolation unit outputs interpolated pixel values having all color information by interpolating a pixel value at an interpolation point for each color information on the basis of a predetermined arithmetic expression from the pixel values of pixels of the same color falling within a predetermined interpolation region containing the interpolation point among all replacement information-added image data output from the replacement unit. When replacement information of any pixel used for calculation indicates replacement, the interpolation unit uses an arithmetic expression different from the arithmetic expression.

5 Claims, 12 Drawing Sheets

$R_{33} = R_{13}$ $$R_{33} = \frac{R_{13} + R_{53}}{2}$$

$$gBb = \frac{G_{32}+G_{43}}{2}$$

$$rBb = \frac{5 \times R_{33}+R_{31}+R_{51}+R_{53}}{8}$$

$$bBb = \frac{5 \times B_{42}+B_{22}+B_{24}+B_{44}}{8}$$

$$HFBb = \frac{4 \times (G_{32}+G_{43}) - 2 \times (G_{21}+G_{54}) - (G_{41}+G_{52}+G_{23}+G_{34})}{gf}$$

$$g'Bb = Ga + HFBb$$

$$r'Bb = Ra + HFBb$$

$$b'Bb = Ba + HFBb$$

FIG.6A
G32 AS DEFECTIVE PIXEL (THIS ALSO APPLIES TO G43)
$$gBb = G_{43}$$
$$(gBb = G_{32})$$
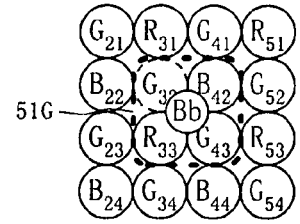
FIG.6B
R33 AS DEFECTIVE PIXEL (THIS ALSO APPLIES TO B42)
$$rBb = \frac{R_{33}+R_{31}+R_{51}+R_{53}}{4}$$
$$(bBb = \frac{B_{42}+B_{22}+B_{24}+B_{44}}{4})$$
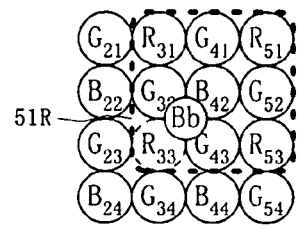
FIG.6C
ONE OR MORE PIXELS OF R31, R51, AND R53, AS DEFECTIVE PIXELS (THIS ALSO APPLIES TO B22, B24, AND B44)
$$rBb = R_{33}$$
$$(bBb = B_{42})$$
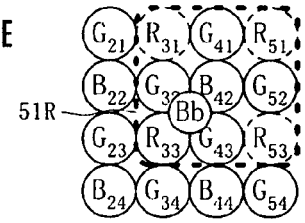
FIG.6D
ONE OR MORE PIXELS OF G21, G23, G32, G34, R41, G43, G52, AND R54 AS DEFECTIVE PIXELS
$$HFBb = 0$$
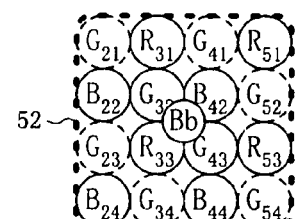
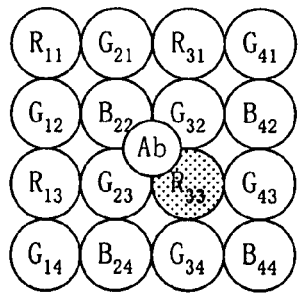
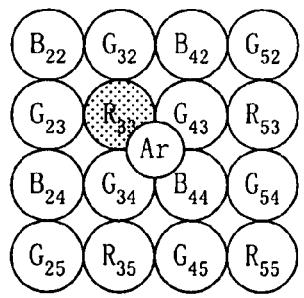
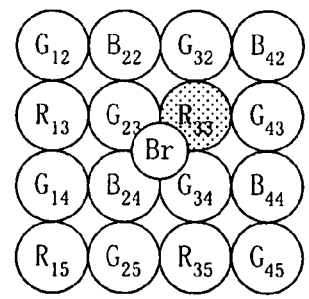
FIG.7A     FIG.7B     FIG.7C

IMAGE PROCESSING APPARATUS

BACKGROUND OF THE INVENTION

The present invention relates to an image processing apparatus and, more particularly, to an image processing apparatus for generating high-quality image data having all color information for each pixel from original image data sensed by a single-CCD color electronic camera device or the like.

Generally in an image sensor such as a CCD (solid-state image sensor) for performing photoelectric conversion for many pixels arrayed in a matrix on a two-dimensional plane, if any pixel is defective, this defective pixel cannot attain a correct output, i.e., pixel value. In the use of such an image sensor, the pixel value of the defective pixel must be compensated using the pixel values of pixels around the defective pixel.

In general, in an image sensing device using a single multi-color filtered image sensor, image data having all color information (RGB or a luminance value and color difference signals) for each pixel is generated by interpolation processing from original image data of an almost checkered pattern having only a pixel value of one original color (e.g., any one of R, G, and B) for each pixel. If original image data obtained by the image sensor contains the pixel value of a defective pixel, the influence of the defective pixel diffuses to neighboring pixels, degrading the image quality.

Conventionally, to compensate for the pixel value of such a defective pixel, it is replaced using the pixel value of a pixel of the same color one or several pixels before the defective pixel, or the average of pixels of the same color before and after the defective pixel. Further, the pixel value of the defective pixel is adaptively replaced based on various conditions using a combination of the pixel values of two or more pixels before and after the defective pixel (see, e.g., Japanese Patent No. 2,636,287 and U.S. Pat. No. 5,805,216).

These pixel value replacement processes can make the defect of original image data obtained by an image sensor less conspicuous. However, a single multi-color filtered image sensor must execute the above-described interpolation processing after replacement processing. Interpolation processing after replacement diffuses the pixel value of the defective pixel replaced using neighboring pixel values to neighboring pixels, and high-quality image data cannot be obtained.

According to a method of replacing the pixel value of a defective pixel using the pixel value of a pixel of the same color positioned immediately before the defective pixel, when a defective pixel $G_{43}$ exists near the boundary between a bright region 101 and a dark region 102, as shown in FIG. 21A, the pixel value of the pixel $G_{43}$ is replaced by that of the pixel $G_{23}$ of the same color positioned immediately before the pixel $G_{43}$. As shown in FIG. 21B, the pixel value of the pixel $G_{43}$ which should originally represent a bright pixel is replaced by a pixel value which represents a dark pixel. The pixel value of the replaced pixel $G_{43}$ is used to generate a pixel value of G color at a neighboring interpolation point in subsequent interpolation processing. Thus, false information diffuses in accordance with the size of the interpolation region.

More specifically, if a defective pixel exists in an interpolation region used to obtain each color information at an interpolation point, predetermined color information contains the pixel value of the defective pixel, so that the pixel value of the defective pixel diffuses to all interpolation points using the interpolation region containing the defective pixel. In an interpolation region of 3×3 pixels centered on an interpolation point, a dark region of 3×3 pixels centered on the pixel $G_{43}$ appears in the bright region 101, as shown in FIG. 21C. High-order interpolation processing using a wider interpolation region in order to ensure a high image quality further widens the influence.

This phenomenon occurs due to not only pixel value replacement processing for compensating for a defective pixel of an image sensor, but also interpolation processing performed after pixel value replacement processing.

SUMMARY OF THE INVENTION

The present invention has been made to overcome the conventional drawbacks, and has as its object to provide an image processing apparatus capable of performing high-speed processing without performing adaptive processing based on complicated conditions in attaining new image data by interpolating a pixel value obtained by an image sensor, and capable of attaining high-quality image data while suppressing the influence of a pixel replaced by another pixel value prior to interpolation processing.

To achieve the above object, according to the present invention, there is provided an image processing apparatus for generating new image data having pixel values having all color information for each interpolation point set on a two-dimensional plane, from original image data made up of many pixels which are arrayed in a matrix on the two-dimensional plane and each of which has only a pixel value representing a predetermined color information level obtained by an image sensor having individual color filters, comprising a replacement unit for, for a pixel value of a pixel that need not be replaced by another pixel value among pixel values contained in the original image data, adding replacement information representing non-replacement of the pixel value to the pixel value, and outputting the pixel value as replacement information-added image data, and for a pixel value of a pixel that needs to be replaced by another pixel value, replacing the pixel value by a predetermined pixel value, adding replacement information indicating replacement of the pixel value to the replaced pixel value, and outputting the pixel value as replacement information-added image data, and an interpolation unit for outputting interpolated pixel values having all color information by interpolating a pixel value at an interpolation point for each color information on the basis of a predetermined arithmetic expression from pixel values of pixels of the same color falling within a predetermined interpolation region containing the interpolation point among all replacement information-added image data output from the replacement unit, and when replacement information of any pixel used for calculation indicates replacement, using an arithmetic expression different from the arithmetic expression.

BRIEF DESCRIPTION OF THE DRAWINGS

FIGS. 6A to 6D are explanatory views showing arithmetic processing of the interpolation processing unit (when a replaced pixel is included);

FIGS. 7A to 7C are explanatory views each showing another setting example of an interpolation point;

DESCRIPTION OF THE PREFERRED EMBODIMENTS

The present invention will be described below with reference to the accompanying drawings.

Figure 1:
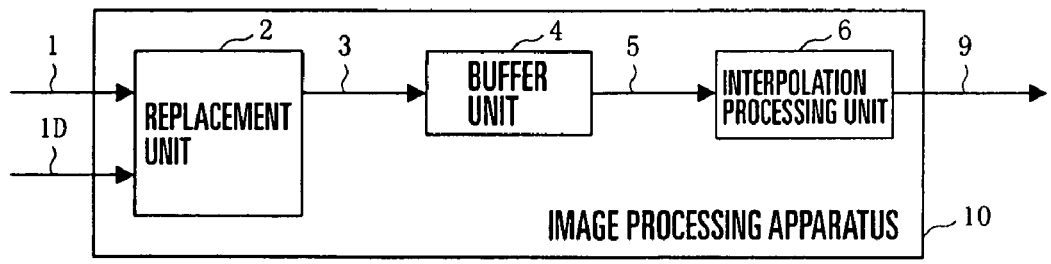
FIG. 1 is a block diagram showing an image processing apparatus according to the first embodiment of the present invention.

FIG. 1 shows an image processing apparatus according to the first embodiment of the present invention. Reference numeral 1 denotes image data output from an image sensor such as a CCD, which is original image data with each pixel value representing a color information level corresponding to a predetermined color filter; and 10, an image processing apparatus for generating from the original image data 1 new image data 9 made up of pixel values representing all color information levels for each interpolation point set on a two-dimensional plane.

In the image processing apparatus 10, reference numeral 2 denotes a replacement unit. Based on defect information 1D representing the presence/absence of a defect of the pixel the replacement unit 2 replaces, for the pixel value of a defective pixel of the original image data 1, the pixel value by another pixel value to output replacement information representing replacement as replacement information-added image data 3 together with the pixel value, and outputs, for the pixel value of a nondefective pixel, replacement information indicating non-replacement as the replacement information-added image data 3 together with the pixel value.

Reference numeral 4 denotes a buffer unit for temporarily storing the replacement information-added image data 3 sequentially output from the replacement unit 2; and 6, an interpolation processing unit for reading out replacement information-added image data 5 stored in the buffer unit 4, generating, by interpolation processing, pixel values representing all color information levels for a corresponding interpolation point from the pixel values of a plurality of pixels falling within a predetermined pixel region, and when pixel values used for interpolation processing includes a pixel value whose replacement information represents replacement, performing interpolation processing using an arithmetic expression different from a normal one, and outputting each obtained pixel value as the new image data 9.

Figure 2A:
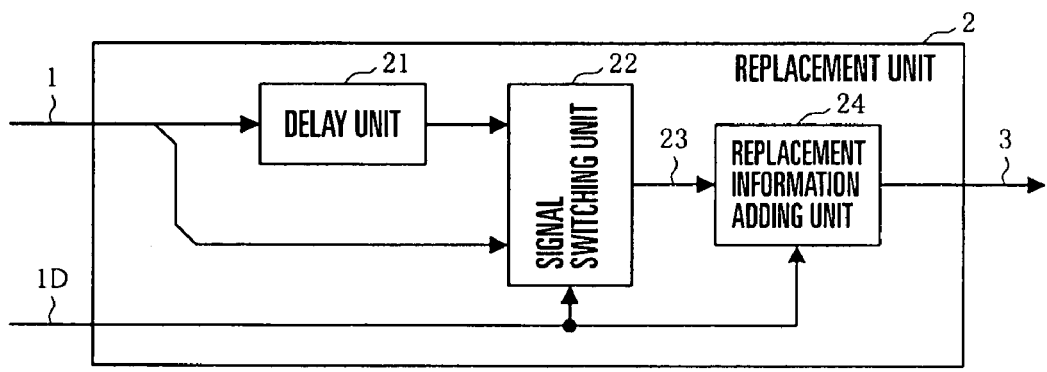
FIGS. 2A to 2C are views showing an arrangement of a replacement unit.

As shown in FIG. 2A, the replacement unit 2 comprises a delay unit 21 for delaying the original image data 1 by two pixels, a signal switching unit 22 for selectively outputting an output from the delay unit 21 and the original image data 1 based on the defect information 1D, and a replacement information adding unit 24 for adding to an output 23 from the signal switching unit 22 replacement information (in this case, the defect information 1D) indicating replacement/non-replacement of the pixel value, and outputting the resultant information as the replacement information-added image data 3.

Figure 2B:
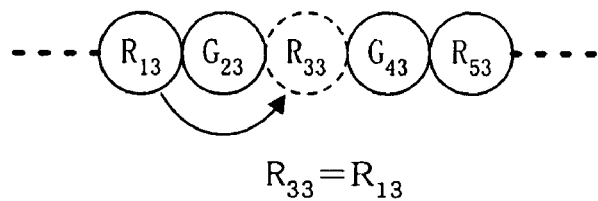

A general CCD discretely, sequentially outputs the pixel values of respective pixels as analog values in the pixel line direction. These pixel values output from the CCD are A/D-converted in advance, and sequentially input as original image data 1 of digital values to the image processing apparatus 10. When the pixel $R_{33}$ is defective, as shown in FIG. 2B, the pixel value of the pixel $R_{13}$ of the same color positioned immediately before the pixel $R_{33}$, and held in the delay unit 21 is used as the pixel value of the pixel $R_{33}$. If the pixel $R_{33}$ is not defective, the input original image data 1 is directly output.

Figure 2C:
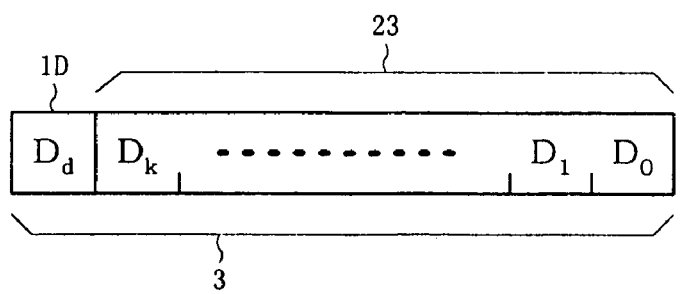

In general, the defective pixel position of the CCD is provided as address information indicating the defect position. In this case, a defect information generation unit (see FIG. 20) or the like compares an address representing the pixel position of the input original image data 1 with address information of the defect position, and outputs the defect information 1D representing whether to replace the pixel value of the original image data 1 (defective pixel), in synchronism with the original image data 1 when the addresses are matched. As shown in FIG. 2C, the replacement information adding unit 24 adds a bit Dd (non-replacement=0, replacement=1) representing replacement information to bits D0 to Dk of the output 23 representing a pixel value after replacement processing by the signal switching unit 22 in accordance with the defect information 1D, and outputs the replacement information-added image data 3.

Figure 3A:
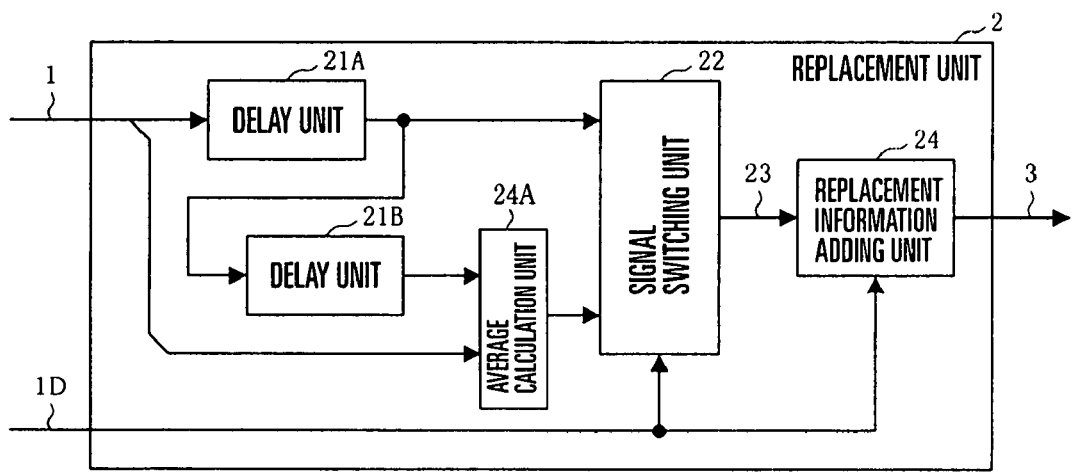
FIGS. 3A and 3B are views showing another arrangement of the replacement unit.
Figure 3B:
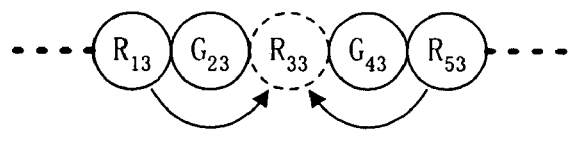

As the pixel value replacement method, as shown in FIGS. 3A and 3B, the pixel value of a defective pixel may be replaced using the pixel values of pixels of the same color positioned before and after the defective pixel. In this case, as shown in FIG. 3A, two delay units 21A and 21B are series-connected. For a nondefective pixel, an output from the delay unit 21A is selected; and for a defective pixel, the average of an output from the delay unit 21B and the original image data 1 that is calculated by an average calculation unit 24A is selected. If the pixel $R_{33}$ is defective, as shown in FIG. 13B, the average pixel value of a preceding pixel $R_{13}$ of the same color and a subsequent pixel $R_{53}$ of the same color is output as a new pixel value of the pixel $R_{33}$.

In the above description, the replacement unit 2 is constituted using a general pixel replacement method. However, the present invention is not limited to this, and may use another pixel replacement method. A case wherein the pixel value of a defective pixel is to be replaced will be exemplified. The target to be replaced is not limited to this, and the present invention can be applied to any arrangement so long as interpolation processing is done after pixel value replacement processing.

In the present invention, replacement information indicating replacement/non-replacement of the pixel value must be added to each pixel value. This replacement information can be added to any position. The replacement information may be added to the most significant bit side of the pixel value 23, as shown in FIG. 2C, or to the least significant bit side or between bits.

Figure 4:
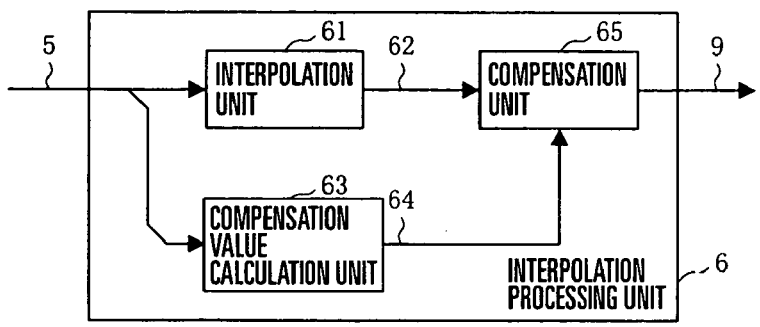
FIG. 4 is a block diagram showing an interpolation processing unit according to the first embodiment of the present invention.

The interpolation processing unit 6 according to the first embodiment of the present invention will be described with reference to FIG. 4. FIG. 4 shows an arrangement of the interpolation processing unit. An interpolation processing unit having a function of compensating for an interpolated pixel value by a pixel value as the representative of the luminance value will be exemplified.

In FIG. 4, the interpolation processing unit 6 is constituted by an interpolation unit 61 for performing interpolation processing for the replacement information-added image data 5 read out from the buffer unit 4, and outputting an interpolated pixel value 62, a compensation value calculation unit 63 for calculating a luminance compensation value 64 from a pixel value as the representative of the luminance value in the replacement information-added image data 5, and a compensation unit 65 for compensating for the interpolated pixel value 62 using the luminance compensation value 64, and outputting desired image data 9.

The interpolation unit 61 and compensation value calculation unit 63 determine whether a replaced pixel exists in pixel regions used for their arithmetic processes, on the basis of replacement information of the read replacement information-added image data 5, and select arithmetic expressions used for the arithmetic processes in accordance with the determination results.

Figures 5A, 5B, 5C:
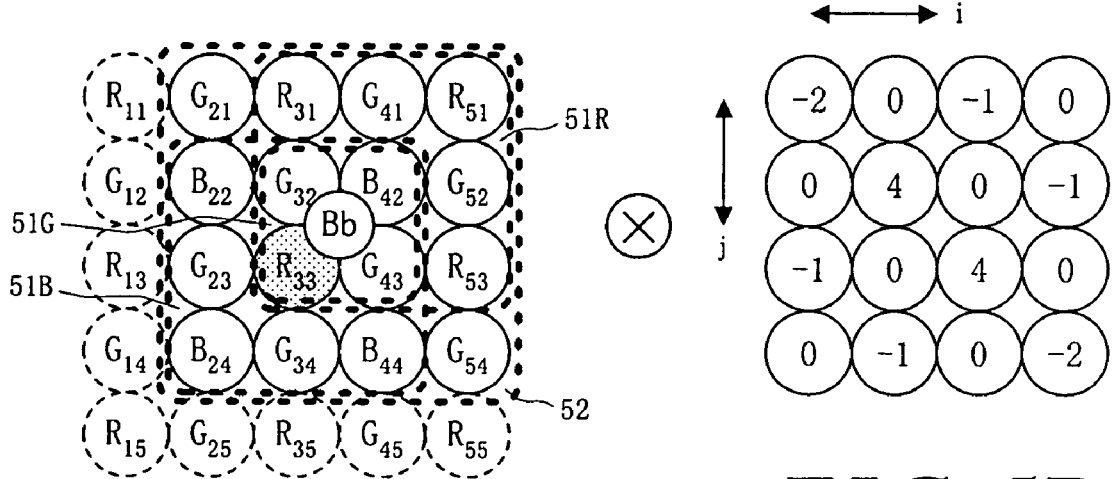
FIGS. 5A to 5C are explanatory views showing arithmetic processing of the interpolation processing unit (normal operation)

FIGS. 5A to 5C show the operation of the interpolation processing unit 6. FIG. 5C shows normal arithmetic expressions used when no replaced pixel exists in pixel regions used for interpolation processing and compensation value calculation processing. In the following description, the interpolation point is set at a position shifted from each pixel position, i.e., between pixels of the original image data 1 (replacement information-added image data 5). However, the interpolation point is not limited to this, and may be set on a pixel.

In FIG. 5A, an interpolation point Bb is set at a position surrounded by pixels $R_{33}$, $G_{32}$, $G_{43}$, and $B_{42}$. In this case, the interpolation unit 61 calculates, based on equations shown in FIG. 5C, interpolated pixel values 62 (gBb, rBb, bBb) from neighboring pixels of the same color included in an interpolation region 51G of 2×2 pixels or an interpolation region 51R or 51B of 3×3 pixels containing the interpolation point Bb.

At the same time, the compensation value calculation unit 63 generates a luminance compensation value 64 (HFBb) for compensating for the pixel value of each color information at the interpolation point Bb in accordance with an equation shown in FIG. 5C using the pixel values of a plurality of pixels which are positioned around the interpolation point Bb and serve as the representative of the luminance value, filter coefficients shown in FIG. 5B, and a compensation scale factor (weighting factor) gf. Calculation of the luminance compensation value 64 uses predetermined pixels falling within a range centered on the interpolation point Bb, e.g., compensation region 52 of 4×4 pixels corresponding to filter coefficients that is wider than a range of pixels around the interpolation point used for interpolation processing by the interpolation unit 61.

Each interpolated pixel value 62 calculated by the interpolation unit 61 does not contain any high spatial frequency components of pixels around the interpolation point. To the contrary, the pixel compensation value 64 contains a high spatial frequency component with a characteristic corresponding to the compensation region 52 and the filter coefficients. As given by the arithmetic expressions of FIG. 5C, the compensation unit 65 adds (or integrates) the pixel compensation value 64 to the interpolated pixel values 62 to compensate for the interpolated pixel values 63 for the respective pieces of color information, and calculates new pixel values (g'Bb, r'Bb, and b'Bb) of the respective pieces of color information, i.e., desired new image data 9 at the interpolation point Bb.

If a replaced pixel exists in pixel regions used for interpolation processing and compensation value calculation processing, another arithmetic expressions or coefficients set are used as corresponding arithmetic expressions in accordance with the positional relationship between the replaced pixel and the interpolation point, as shown in FIGS. 6A to 6D. For example, if a G pixel (pixel $G_{32}$ or $G_{43}$) in the interpolation region 51G is a replaced pixel, as shown in FIG. 6A, the weight of the replaced pixel is set to 0, and its pixel value is not used in calculating the G component gBb at the interpolation point Bb. The pixel value of the other nondefective pixel other than the replaced pixel is directly used as the G component gBb.

If an R pixel (pixel $R_{33}$) near the interpolation point Bb in the interpolation region 51R is a replaced pixel, the weight of the pixel $R_{33}$ is reduced in calculating the R component rBb at the interpolation point Bb in order to reduce the influence of the replaced pixel. The weights of, e.g., pixels $R_{33}$, $R_{31}$, $R_{51}$, and $R_{53}$ in the interpolation region 51R are made equal, and the average of these pixel values is used as the R component rBb. As shown in FIG. 5A, the interpolation regions 51R and 51B are at symmetrical positions about the interpolation point Bb. Thus, by replacing R pixels in FIG. 6B by B pixels, this processing can also be applied to calculation of the B component bBb when the pixel $B_{42}$ is a replaced pixel.

If one or more R pixels (pixels $R_{31}$, $R_{51}$, and $R_{53}$) other than an R pixel nearest to the interpolation point Bb in the interpolation region 51R are replaced pixels, the weights of all the pixels $R_{31}$, $R_{51}$, and $R_{53}$ are set to 0 in calculating the R component rBb at the interpolation point Bb in order to reduce the influence of the replaced pixels and prevent offset of interpolation using the remaining pixels. Then, the pixel value of the pixel $R_{33}$ nearest to the interpolation point Bb is used as the R component rBb. As shown in FIG. 5A, the interpolation regions 51R and 51B are at symmetrical positions about the interpolation point Bb. Hence, by replacing R pixels in FIG. 6C by B pixels, this processing can also be applied to calculation of the B component bBb when any of the pixels $B_{22}$, $B_{24}$, and $B_{44}$ are replaced pixels.

If one or more G pixels (pixels $G_{21}$, $G_{23}$, $G_{32}$, $G_{34}$, $G_{41}$, $G_{43}$, $G_{52}$, and $G_{54}$) in the compensation region 52 are replaced pixels, as shown in FIG. 6D, the weights of the pixels $G_{21}$, $G_{23}$, $G_{32}$, $G_{34}$, $G_{41}$, $G_{43}$, $G_{52}$, and $G_{54}$ are set to 0 in calculating the pixel compensation value HFBb at the interpolation point Bb. As the pixel compensation value HFBb, 0 (non-compensation) is used.

In FIGS. 5A to 5C and 6A to 6D, the interpolation point Bb is set as shown in FIG. 5A, i.e., a B pixel (pixel $B_{42}$) exists at the upper right of the interpolation point. The above processing can also be applied to an interpolation point having another positional relationship. When the interpolation point is set at a position different from each pixel position, i.e., among pixels of the original image data 1 (replacement information-added image data 5), the interpolation point may be set to an interpolation point Ab (B pixel exists at the upper left of the interpolation point), Ar (R pixel exists at the upper left of the interpolation point), and Br (R pixel exists at the upper right of the interpolation point) as patterns other than FIG. 5A.

In FIG. 7A, the pixel array example in FIG. 5A can be regarded to be horizontally reversed (or rotated through 90°). In this case, the interpolation regions 51R and 51B, and the filter coefficients in FIG. 5B are horizontally reversed (or rotated through 90°), and the pixel values of the respective arithmetic expressions are exchanged. In FIGS. 7B and 7C, R and B pixels in FIGS. 7A and 5A are regarded to be exchanged. In this case, interpolated pixel values are calculated by exchanging R and B pixels. In any case, interpolation processing and pixel compensation processing corresponding to the presence/absence of a replaced pixel can be executed using the same arithmetic expressions in FIGS. 5C and 6A to 6D.

In this manner, when a replaced pixel exists in pixels subjected to calculation in the interpolation regions 51G, 51R, and 51B used for interpolation processing and the compensation region 52 used for compensation value calculation processing, interpolation processing and compensation value calculation processing use arithmetic expressions different from normal ones, e.g., arithmetic expressions using reduced weights or a weight of 0 for the pixel value of the replaced pixel. This can reduce or suppress the influence of the replaced pixel. Compared to directly using the pixel value of a replaced pixel replaced by a predetermined pixel value obtained from a neighboring pixel, even if the replaced pixel and its neighboring pixels have a pixel value difference, diffusion of the pixel value difference by interpolation processing or pixel compensation processing after replacement can be suppressed to attain a high-quality image signal.

Figure 8:
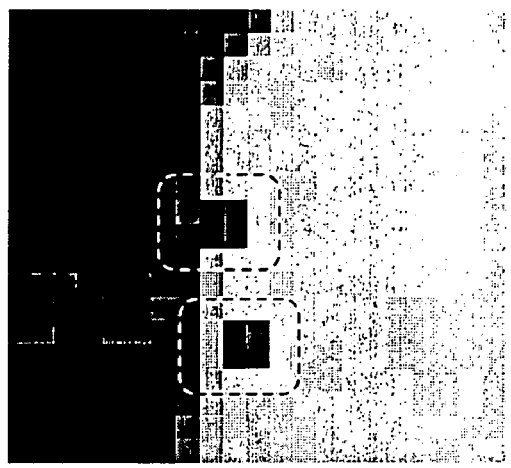
FIG. 8 is an explanatory view showing an example of the image processing result when interpolation processing is done after a defective pixel is replaced.
Figure 9:
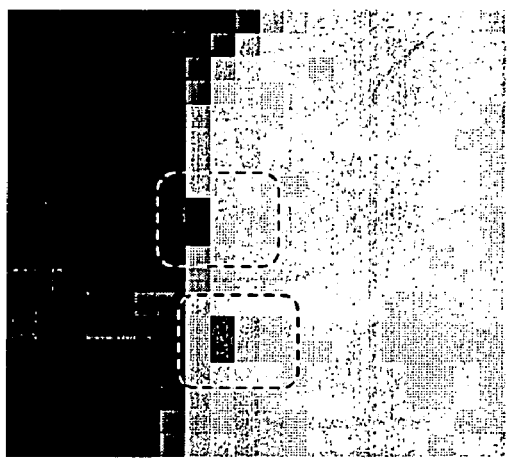
FIG. 9 is an explanatory view showing an example of the image processing result when the present invention is applied to only interpolation processing.
Figure 10:
FIG. 10 is an explanatory view showing an example of the image processing result when the present invention is applied to interpolation processing and compensation value calculation processing.
Figure 21A:
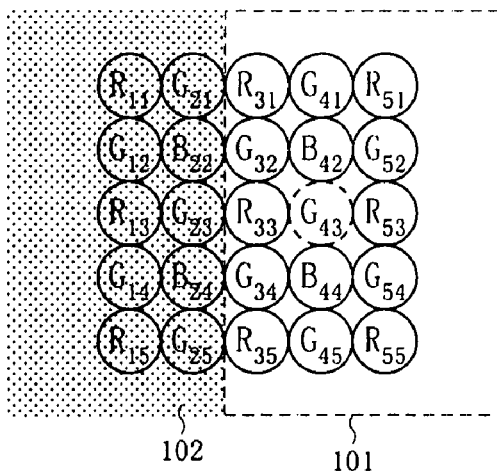
FIGS. 21A to 21C are explanatory views showing conventional image processing.
Figure 21B:
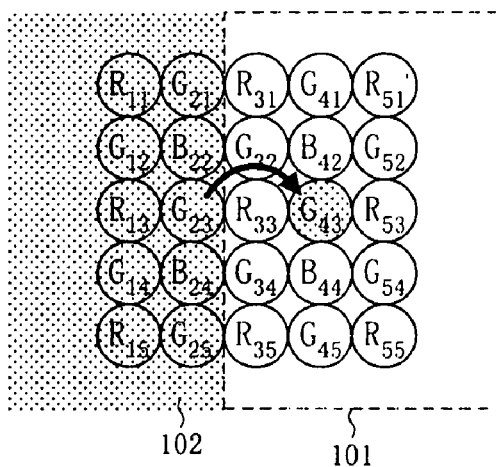
Figure 21C:
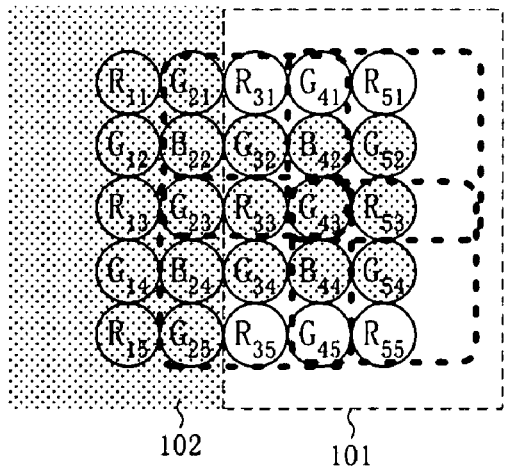

FIGS. 8 to 10 show image processing results representing the influence of a replaced pixel (defective pixel). FIG. 8 shows an image processing result when interpolation processing is simply performed after pixel replacement. FIG. 9 shows an image processing result when the present invention is applied to only interpolation processing. FIG. 10 shows an image processing result when the present invention is applied to interpolation processing and compensation value calculation processing. In these examples, the pixel value of a replaced pixel in a bright region is replaced by a pixel value in a dark region near the boundary between the dark and bright regions, as shown in FIGS. 21A to 21C.

The image processing results in FIGS. 8 to 10 are obtained for an interpolation point set at a different position from each pixel position of the original image data 1, similar to FIG. 5A. The pixel (shown as rectangles) positions of the image processing results is not exactly same as the original position (not shown) of the replaced pixel.

In FIG. 8, the pixel value of a replaced pixel originally present in a bright region is replaced by a pixel value in a dark region, and the replaced value is directly used to perform interpolation processing. As a result, the pixel value in the dark region is diffused by interpolation processing, and several pixels become dark at positions surrounded by broken lines in FIG. 8, i.e., near the replaced pixel in the bright region.

In FIG. 9, the present invention is applied to interpolation processing. When a replaced pixel exists in the interpolation region, an arithmetic expression different from a normal one, e.g., a reduced weight or a weight of 0 for the replaced pixel value is used.

In FIG. 9, even if the pixel value of a replaced pixel is replaced by a pixel value in a dark region, the pixel value levels of dark pixels are reduced at positions surrounded by broken lines in FIG. 9, i.e., near the replaced pixel in the bright region. Diffusion of the pixel value difference by interpolation processing after pixel replacement is suppressed.

In FIG. 10, the present invention is applied to interpolation processing and pixel compensation processing. Almost no pixels become dark at positions surrounded by broken lines in FIG. 10, i.e., near the replaced pixel within the bright region. Diffusion of the pixel value difference by interpolation processing and pixel compensation processing after pixel replacement is suppressed, and high-quality image data is obtained.

The interpolation unit 61 calculates each interpolated pixel value 62 at the interpolation point from the pixel values of pixels of the same color falling within each of the predetermined interpolation regions 51G, 51R, and 51B containing the interpolation point. The compensation value calculation unit 63 calculates the pixel compensation value 64 at the interpolation point from the pixel values of a plurality of pixels falling within the compensation region 52 wider than and including any interpolation region used by the interpolation unit 61. The compensation unit 65 compensates for each interpolated pixel value 62 using the pixel compensation value 64. A high spatial frequency component which cannot be obtained by low-order interpolation in the interpolation unit 61 is compensated using the pixel compensation value 64, thereby obtaining a new pixel value containing the high spatial frequency component.

As a result, a high-quality image having a high frequency component can be attained by relatively simple processing without performing high-order interpolation for all color information using the pixel values of pixels in a wide range or performing complicated interpolation processing under various conditions around the interpolation point.

The compensation value calculation unit 63 calculates the pixel compensation value 64 using only the pixel values of a plurality of pixels having color information which represents the luminance component of an image signal, e.g., using only the pixel values of G pixels for an image signal of a Bayer array, as shown in FIG. 5A. Thus, the compensation unit 65 can compensate for only luminance components for the pixel values of pixels of each color information without changing color balance. In general, a pixel serving as the representative of the luminance component is large in number and has the highest frequency component. A new pixel value containing a higher frequency component can be obtained, compared to a pixel value interpolated by only pixels of the same color.

Figure 11:
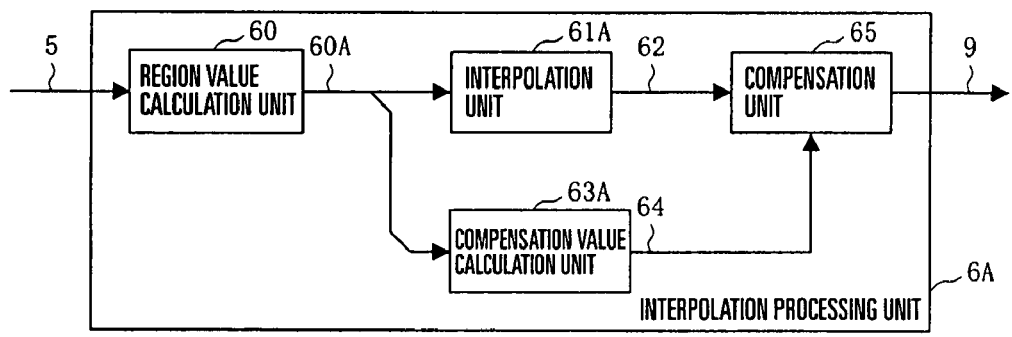
FIG. 11 is a block diagram showing an interpolation processing unit according to the second embodiment of the present invention.

An interpolation processing unit 6A according to the second embodiment of the present invention will be described with reference to FIG. 11. FIG. 11 shows an arrangement of the interpolation processing unit.

In FIG. 4, the interpolation unit 61 and compensation value calculation unit 63 directly receive the replacement information-added image data 5 from the buffer. In the second embodiment, as shown in FIG. 11, a region value calculation unit 60 is adopted to receive and pre-process replacement information-added image data 5, and the replacement information-added image data 5 is distributed to an interpolation unit 61A and compensation value calculation unit 63A.

In FIG. 11, the region value calculation unit 60 receives the replacement information-added image data 5, and outputs the logical OR of replacement information and the sums of the pixel values of pixels belonging to respective pixel regions, as region values 60A for the respective pixel regions set in advance on a sub-matrix made up of a plurality of pixels including the interpolation point as the center. The region values 60A calculated by the region value calculation unit 60 are parallel-output in synchronism with reception of a pixel block.

Processes executed in the interpolation unit 61A and compensation value calculation unit 63A are the same as in the interpolation unit 61 and compensation value calculation unit 63 in FIG. 4 except that the interpolation unit 61A and compensation value calculation unit 63A do not directly receive the replacement information-added image data 5, but selectively use the region values 60A parallel-output from the region value calculation unit 60 to sequentially calculate and output interpolated pixel values 62 and a pixel compensation value 64 at the interpolation point on the corresponding sub-matrix.

Figures 12A, 12B:
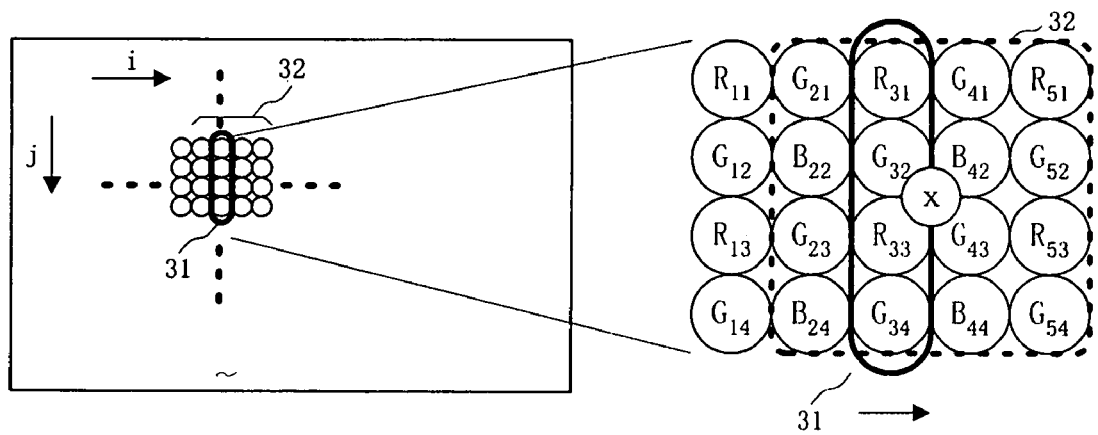
FIGS. 12A to 12C are explanatory views showing the operation of a region value calculation unit.
Figure 12C:
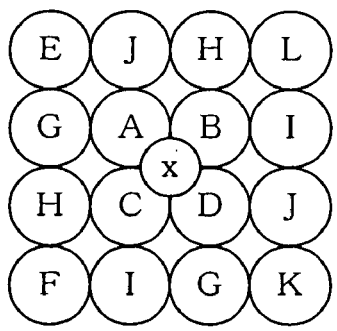

FIGS. 12A to 12C show the operation of the region value calculation unit. FIG. 12A shows the two-dimensional plane image of the replacement information-added image data 5, FIG. 12B shows a sub-matrix, and FIG. 12C shows regions set on the sub-matrix.

As shown in FIG. 12A, the region value calculation unit 60 sequentially receives pixel values forming the replacement information-added image data 5 by a predetermined number of pixel lines (j direction), e.g., four pixel lines as the number of pixel lines necessary for calculating the pixel compensation value 64 in parallel with each other in units of single pixel columns as pixel blocks 31.

As shown in FIGS. 12B and 12C, a sub-matrix 32 centered on an interpolation point x is formed from the pixel blocks 31 corresponding to four pixel columns as a predetermined number of successively received pixel columns (i direction), e.g., the number of pixel columns necessary for calculating the pixel compensation value 64. Respective regions A to L are set in advance in the sub-matrix 32 using the interpolation point x as a center. Then, the sub-matrix 32 (and interpolation point x) shifts by one pixel in the i direction on the two-dimensional plane image in synchronism with reception of the pixel block 31 by the region value calculation unit 60. Sequential calculation of a new pixel value at the interpolation point x in synchronism with reception of the pixel block realizes pipeline processing.

For the respective regions A to L set in advance using the interpolation point x as a center on the sub-matrix 32 constituted in this way, as shown in FIG. 12C, the region value calculation unit 60 calculates the sums, i.e., region values 60A of the pixel values of pixels belonging to the respective pixel regions. Then, the region value calculation unit 60 parallel-outputs the region values in synchronism with reception of the pixel block 31. The interpolation unit 61A and compensation value calculation unit 63A selectively use the parallel-output region values, and sequentially calculate and output interpolated pixel values 62 and a pixel compensation value 64 at the interpolation point on the corresponding sub-matrix.

These pixel regions are set based on arithmetic expressions used by the interpolation unit 61A and compensation value calculation unit 63A. FIG. 12C shows the pixel regions A to L when interpolation processing and pixel compensation value calculation processing in the first embodiment are employed.

A case wherein the pixel regions A to L are set as pixel regions in advance will be exemplified.

Figure 13:
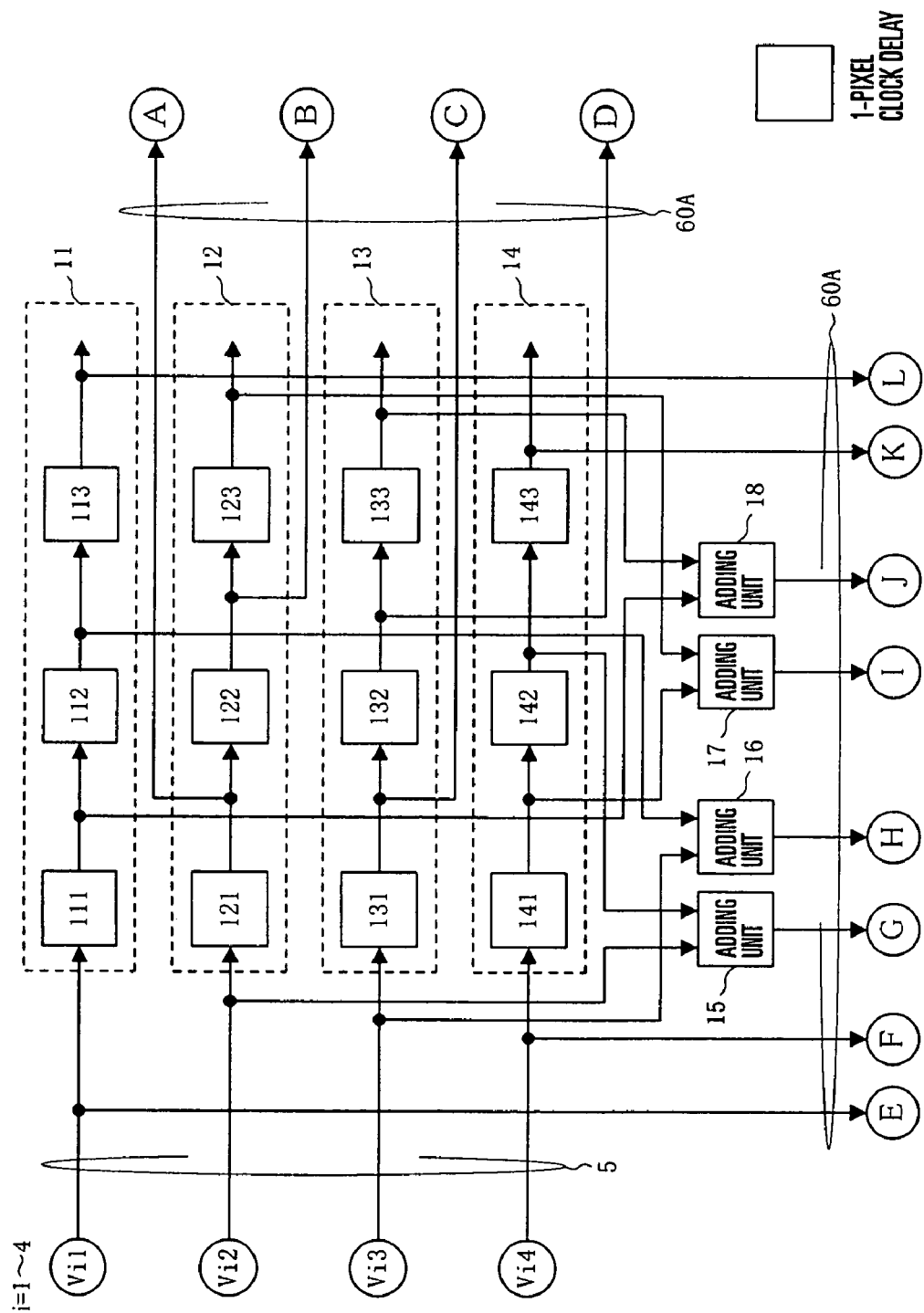
FIG. 13 is a block diagram showing an arrangement of the region value calculation unit.

FIG. 13 shows an arrangement of the region value calculation unit.

In FIG. 13, reference numerals 11 to 14 denote shift registers each made up of three series-connected 1-pixel clock delays 111 to 113, 121 to 123, 131 to 133, or 141 to 143. The shift registers 11 to 14 are arranged in parallel with each other for pixel values Vi1 to Vi4 of the pixel blocks 31. The "1-pixel clock delay" (to be referred to as a delay hereinafter) is a latch circuit for delaying and outputting an input pixel value in synchronism with a pixel clock signal in the pixel line direction (i direction).

When four successive pixel blocks 31 are sequentially received, the delays of the shift registers 11 to 14 output pixel values at pixel positions on the sub-matrix 32. If necessary, a plurality of pixel values constituting each pixel region are added by adding units 15 to 18, and the logical OR of replacement information is calculated, thereby obtaining each region value. The region value calculation unit 60 calculates the region values 60A (A to L) from the received sub-matrix 32, and parallel-outputs them.

Figure 15:
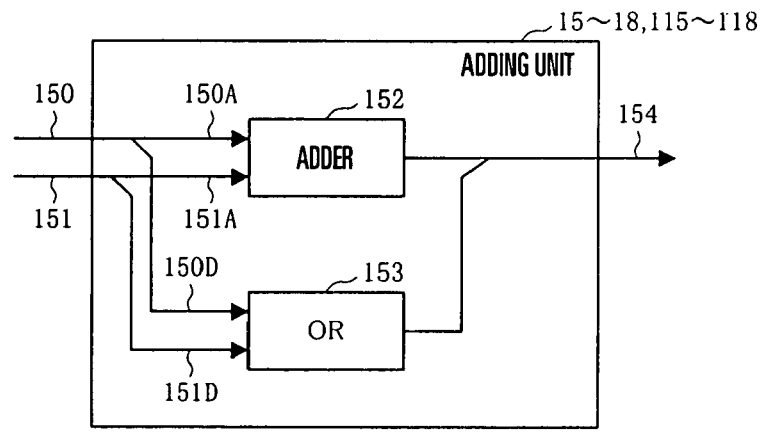
FIG. 15 is a block diagram showing an arrangement of an adding unit.

FIG. 15 shows an arrangement of an adding unit. Of two replacement information-added image data 150 and 151, pixel values 150A and 151A are added by an adder 152, and pieces of replacement information 150D and 151D are ORed by an OR gate 153. The sum and OR are output as a new replacement information-added pixel value 154.

Figure 14:
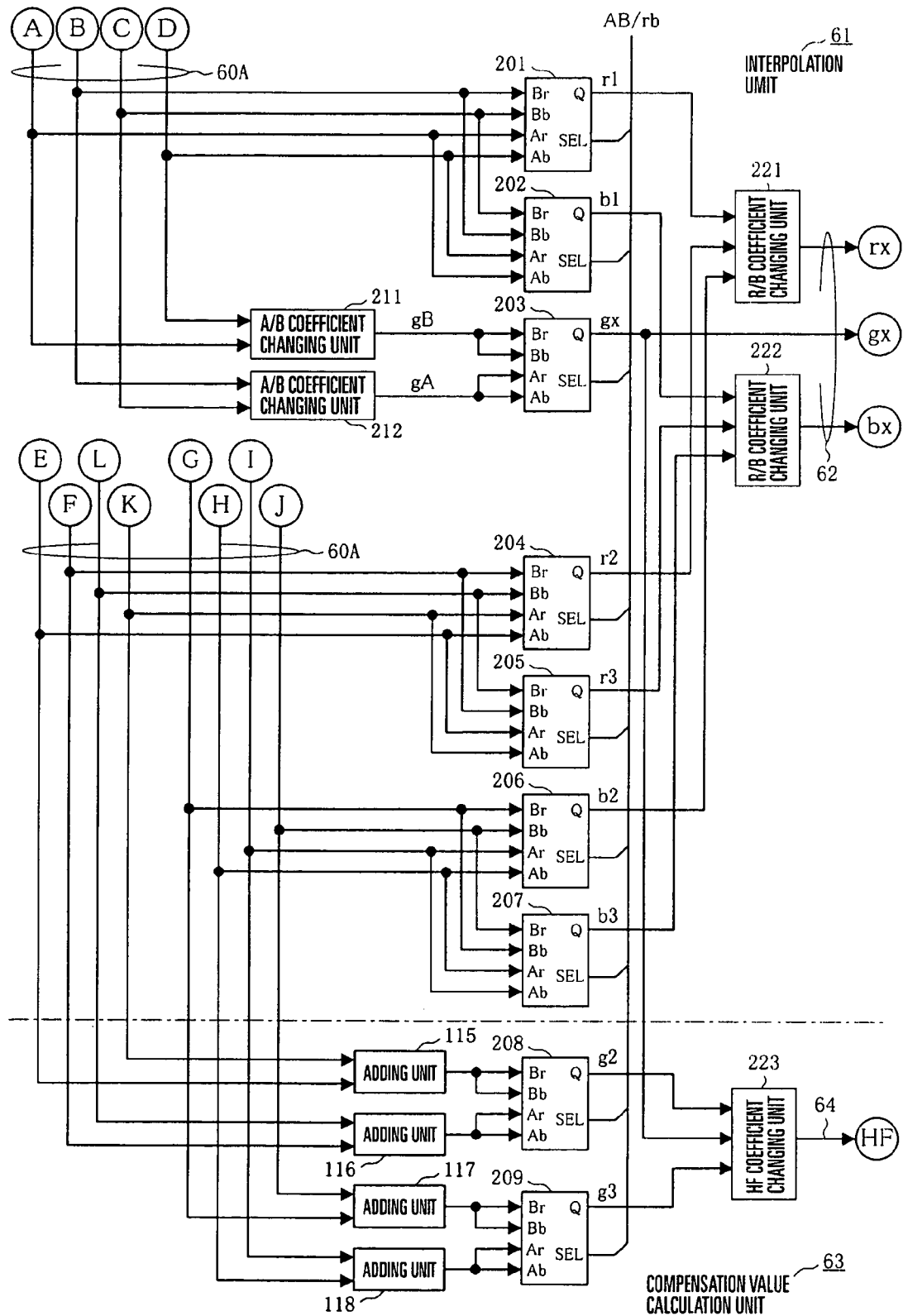
FIG. 14 is a block diagram showing arrangements of an interpolation unit and compensation value calculation unit.

FIG. 14 shows arrangements of the interpolation unit and compensation value calculation unit.

In the interpolation unit 61A and compensation value calculation unit 63A, reference numerals 201 to 209 denote selectors each for selecting and outputting any one of four inputs (Br, Bb, Ar, Ab) based on a selection signal AB/rb representing the positional relationship between the interpolation point x and the color component of an upper right or left pixel. In this case, A and B correspond to regions A and B in FIG. 12C, and Bb represents a B region, i.e., a positional relationship in which a B pixel exists at the upper right of the interpolation point x.

For the positional relationship in which a B pixel exists at the upper right of the interpolation point x, the selection signal AB/rb is "Bb". The selectors 201 to 209 output signals at their inputs Bb from their outputs Q.

Adding units 115 to 118 of the compensation value calculation unit 63A have the same arrangement as that in FIG. 15.

Figure 16:
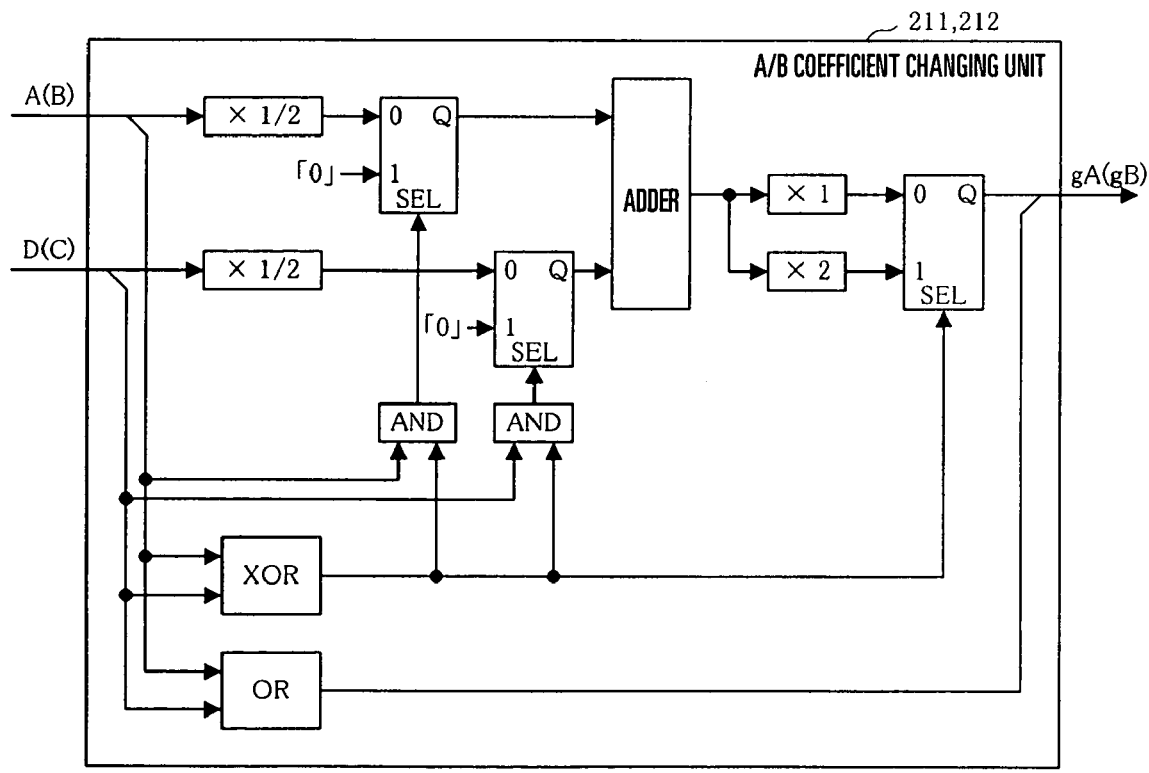
FIG. 16 is a block diagram showing an arrangement of an A/B coefficient changing unit.

A/B coefficient changing units 211 and 212 of the interpolation unit 61A have an arrangement as shown in FIG. 16. Each A/B coefficient changing unit switches and selects a coefficient for an arithmetic expression for calculating a G component gA (gB) at the interpolation point x from these region values on the basis of replacement information contained in two input region values A and D (or B and D). The A/B coefficient changing unit 211 calculates a G component at the interpolation point x for positional relationships Br and Bb on the basis of the arithmetic expressions shown in FIGS. 5C and 6A. The A/B coefficient changing unit 212 calculates a G component at the interpolation point x for positional relationships Ar and Ab.

Figure 17:
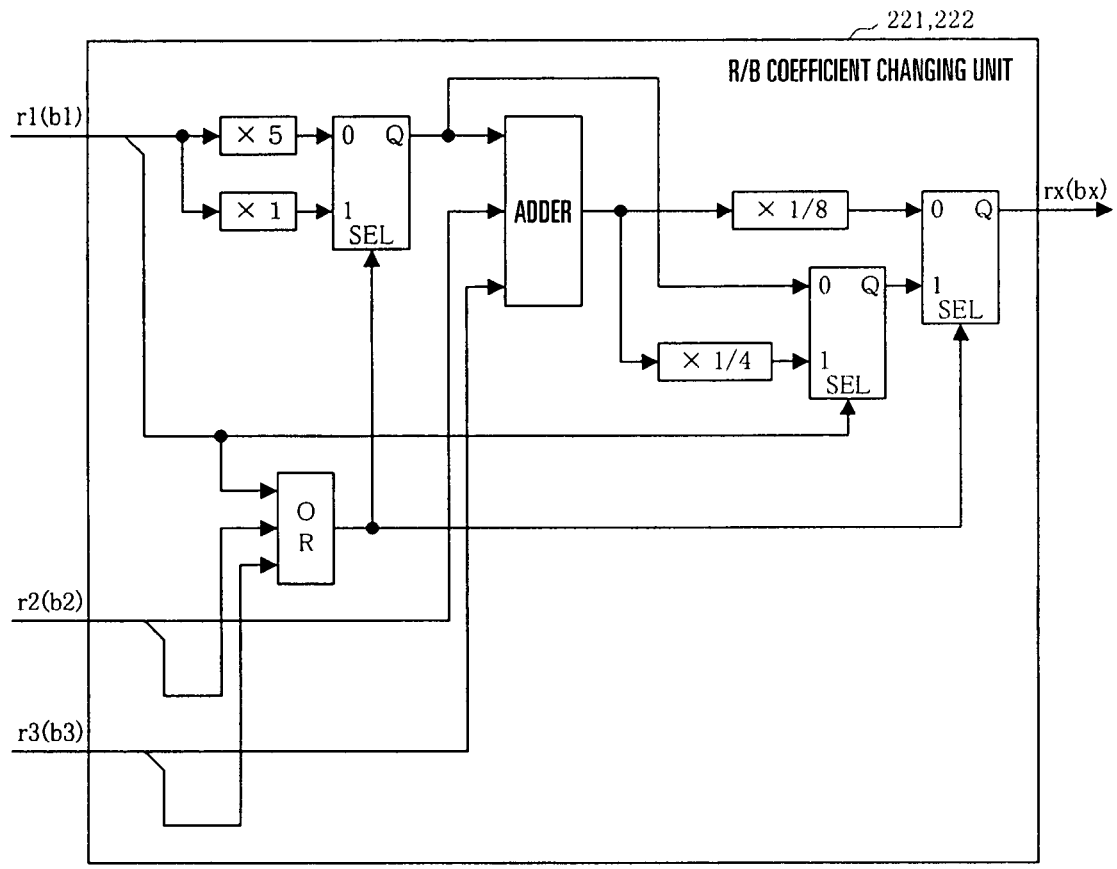
FIG. 17 is a block diagram showing an arrangement of an R/B coefficient changing unit.

R/B coefficient changing units 221 and 222 of the interpolation unit 61A have an arrangement as shown in FIG. 17. Each R/B coefficient changing unit switches and selects a coefficient for an arithmetic expression for calculating an R component rx (or B component bx) at the interpolation point x from these color component values using the arithmetic expressions shown in FIGS. 5C, 6B, and 6C on the basis of replacement information contained in three input color component values r1, r2, and r3 (or b1, b2, and b3).

Figure 18:
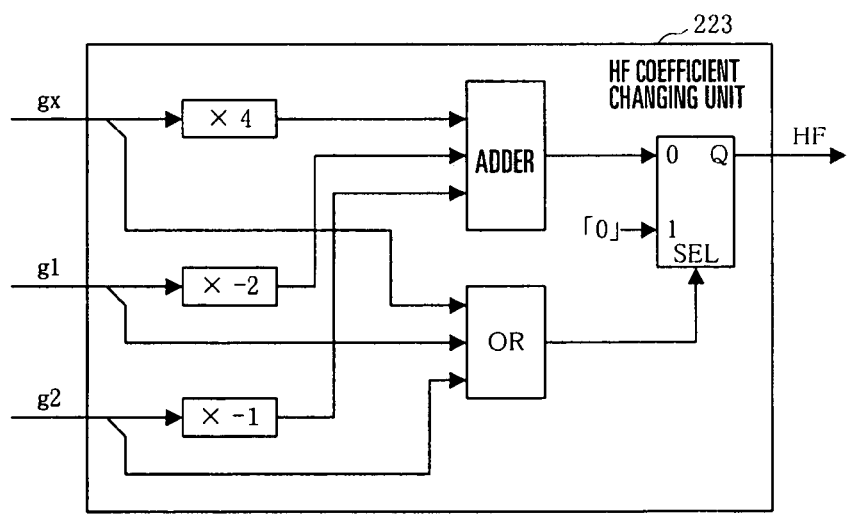
FIG. 18 is a block diagram showing an arrangement of an HF coefficient changing unit.

An HF coefficient changing unit 223 of the compensation value calculation unit 63A has an arrangement as shown in FIG. 18. The HF coefficient changing unit 223 switches and selects a coefficient for an arithmetic expression for calculating the pixel compensation value 64 (HF) at the interpolation point x from these color component values using the arithmetic expressions shown in FIGS. 5C and 6D on the basis of replacement information contained in three input G component values gx, g1, and g2. In practice, when a replaced pixel is included, the HF coefficient changing unit 223 selects and outputs a value representing non-compensation.

Each of the 2-input selectors shown in FIGS. 14 to 18 selects the "input 0" side as the output Q when a selection signal SEL is "0", i.e., a pixel is not replaced, and the "input 1" side as the output Q when the selection signal SEL is "1", i.e., a pixel is replaced.

Figure 19:
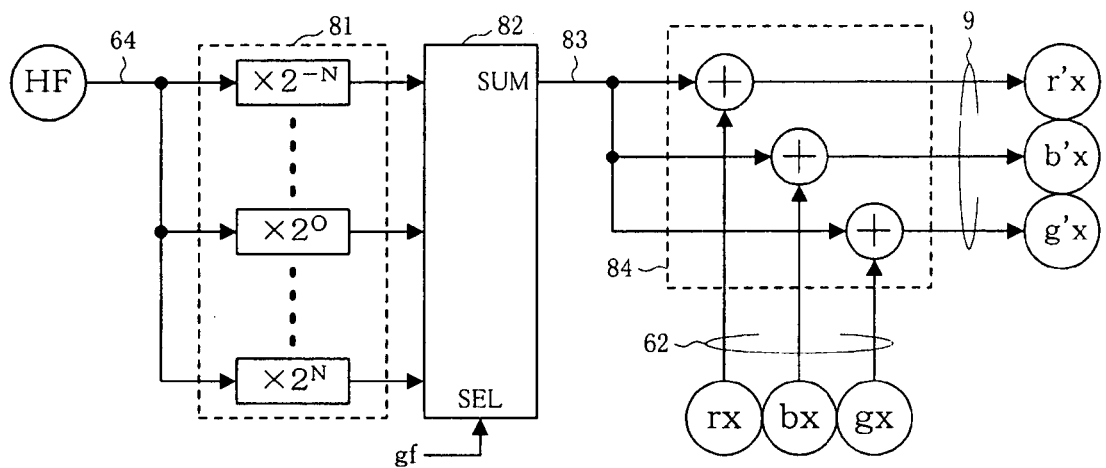
FIG. 19 is a block diagram showing an arrangement of a compensation unit.

In this fashion, the interpolation unit 61A calculates the interpolated pixel values 62 (gx, rx, bx), the compensation value calculation unit 63A calculates the pixel compensation value 64 (HF), and the compensation unit 65 compensates for the interpolated pixel values 62 by the pixel compensation value 64. FIG. 19 shows an arrangement of the compensation unit. In FIG. 19, reference numeral 81 denotes an integration unit made up of a plurality of integrators for integrating (dividing) the pixel compensation value 64 by a power value of 2. The respective integrators are parallel-connected. Reference numeral 82 denotes an adder for selectively adding at least one of outputs from the integrators of the integration unit 81 based on the compensation scale factor (weighting factor) gf.

Reference numeral 84 denotes an adder for individually adding an output 83 from the adder 82 to the interpolated pixel values 62 (gx, rx, and bx), and outputting the sums as new interpolated pixel values (r'x, b'x, and g'x), i.e., desired new image data 9 at the interpolation point that are compensated with the pixel compensation value 64. By arbitrarily selectively inputting the compensation scale factor gf, the interpolated pixel values 62 can be compensated by an intensity corresponding to gf. Since the integration unit 81 is constituted by a plurality of integrators for integrating power values of 2, an arbitrary compensation scale factor gf can be integrated to the pixel compensation value 64 with a simple circuit arrangement. If the reference level of the pixel compensation value 64 changes in accordance with the position of the interpolation point, gf can be automatically switched in accordance with positional information of the interpolation point to adjust the reference level of the pixel compensation value 64.

As described above, the second embodiment adopts the region value calculation unit 60. The region value calculation unit 60 calculates, as the region values 60A for respective pixel regions set in advance on the sub-matrix 32, the sums of the pixel values of pixels belonging to the respective pixel regions, and parallel-outputs the region values 60A in synchronism with reception of the pixel block 31. The interpolation unit 61A and compensation value calculation unit 63A selectively use the parallel-output region values, and sequentially calculate and output interpolated pixel values and a pixel compensation value at the interpolation point on the corresponding sub-matrix 32.

The sub-matrix 32 shifts on the two-dimensional plane image of the replacement information-added image data 5 in synchronism with reception of the pixel block 31. At the same time, a new interpolated pixel value 9 compensated with the pixel compensation value 64 is attained as the interpolated pixel value of each color signal at the interpolation point corresponding to the sub-matrix 32. This realizes pipeline processing synchronized with reception of the pixel block 31. An interpolated pixel value for a higher image quality can be calculated at a higher speed, compared to a case wherein interpolation processing is done by numerical calculation using DSP or the like.

Replacement information-added image data is generated by adding replacement information indicating replacement/non-replacement to a pixel value replaced by a replacement unit 2. The interpolation processing unit 6A reads in the replacement information-added image data, and switches by respective circuit units the coefficients of arithmetic expressions used for interpolation processing and compensation value calculation processing based on the replacement information added to the pixel value. The circuit arrangement is greatly simplified in comparison with a case wherein replacement information corresponding to a pixel value is distributed to each circuit unit separately from the pixel value. This is very effective particularly for pipeline processing in which pixel values received in the past are held, delayed, and used for calculation because another circuit need not be arranged to individually provide replacement information for each pixel value in synchronism with the pixel.

In the first and second embodiments, a pixel region of 4×4 pixels is used as a sub-matrix, and the interpolation point is set among pixels of the original image data 1 (replacement information-added image data 5). However, the present invention is not limited to this. For example, the present invention can also be applied to a case wherein the number of pixels on one side of the sub-matrix is set to an odd number, and the interpolation point is set at the central pixel.

In FIG. 1, the defect information 1D indicating the presence/absence of a defect of each pixel is input in synchronism with the original image data 1. In general, defective pixel position information indicating the position of a defective pixels among the pixels of a CCD is provided as an address on a two-dimensional image output from the CCD. The defect information 1D must be generated based on this information.

Figure 20:
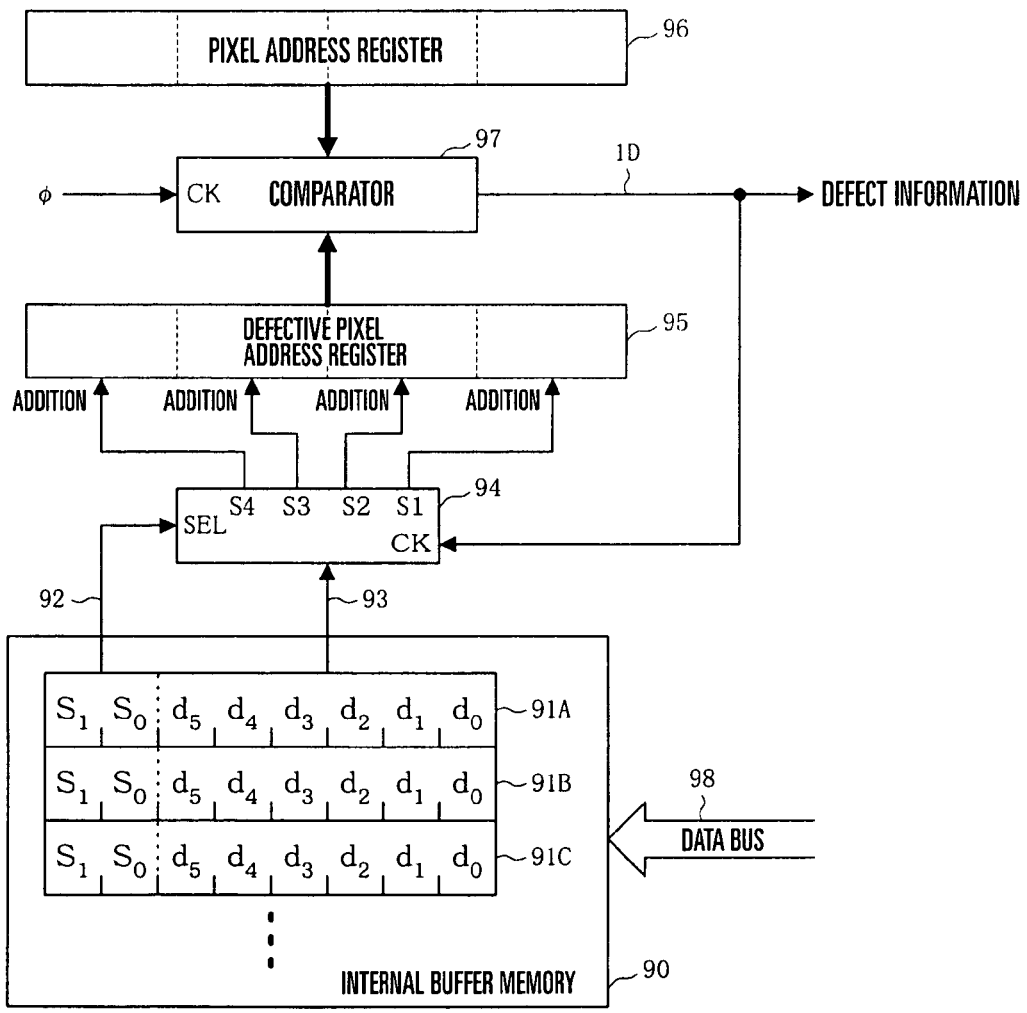
FIG. 20 is a block diagram showing an arrangement of a defect information generation unit.

FIG. 20 shows an arrangement of a defect information generation unit for generating defect information. In this case, defective pixel position information of the CCD is expressed by relative address information in advance.

The "relative address information" indicates a relative value (difference) between addresses for a plurality of defective pixel addresses allocated in the pixel scanning direction on a two-dimensional image.

Each relative address information 91A, 91B, 91C, . . . of defective pixels is loaded to an internal buffer memory 90 via a data bus 98 by the number of defective pixels present on the next pixel line within a short period such as a period during which output of image data from the CCD stops, e.g., a horizontal blanking period. Each of the pieces of relative address information 91A, 91B, 91C, . . . is made up of a relative address value 93 indicating an actual relative address, and area information 92 representing the bit area of the relative address value.

An address control unit 94 reads out the relative address value 93 of the relative address information 91A from the internal buffer memory 90, and adds the relative address value 93 to any bit area of a defective pixel address register 95 based on the area information 92.

A pixel address is set in a pixel address register 96 in synchronism with the original image data 1. The values of the pixel address register 96 and defective pixel address register 95 are compared by a comparator 97 every pixel clock φ.

If these values do not match each other, the original image data 1 is determined to be a nondefective pixel, and "0" is output as the defect information 1D. If these values coincide with each other, the original image data 1 is determined to be a defective pixel, and "1" is output as the defect information 1D. Accordingly, the defect information 1D is obtained in synchronism with the original image data 1.

When "1" representing a defective pixel is output as the defect information 1D, the internal buffer memory 90 selects the next relative address information 91B. The relative address information 91B is read out to the address control unit 94, and the relative address value 93 is added and set in the defective pixel address register 95, as described above. Then, the processing waits for the next defective pixel.

The address control unit 94 checks the contents of the relative address value 93, and reads in a plurality of pieces of relative address information until a predetermined value (e.g., 0) is kept set. Using the pieces of relative address information, a relative address value can be expressed.

In general, when an image processing apparatus of this type executes high-speed pipeline processing, the data bus is often used to input/output various data including pixel values. The data bus can be used to load the address of a defective pixel position from the memory to the internal buffer memory only within a very short time such as a horizontal blanking period during which output of pixel data from the CCD stops.

Considering this situation, defective pixel position information is expressed by relative address information, as shown in FIG. 20. If defective pixels are positioned close to each other in the address space, for example, a plurality of defective pixels are generated on a single pixel line, the information amount necessary for indicating each defective pixel position can be reduced to reduce the storage capacity of the internal buffer memory.

As a larger number of defective pixels concentratedly exist on a single pixel line, the time required for loading, i.e., time for using the data bus becomes shorter than a case wherein defective pixel position information expressed by an absolute address is loaded. Therefore, even when defective pixel position information is loaded within a very short time such as a horizontal blanking period, the influence of using the data bus during this period on another processing can be reduced. High-speed pipeline processing can be realized as a whole.

As has been described above, according to the present invention, when a replaced pixel having a replaced pixel value is included in pixels in an interpolation region used to calculate an interpolated pixel value or in a compensation region used to calculate a pixel compensation value, the interpolated pixel value or pixel compensation value is calculated using an arithmetic expression different from a normal one. This can reduce or suppress the influence of the replaced pixel. Even if the replaced pixel and its neighboring pixel have a pixel value difference, diffusion of the pixel value difference by interpolation processing or pixel compensation processing after replacement can be suppressed to obtain high-quality image data, compared to a case wherein the pixel value of a replaced pixel that is replaced by the pixel value of a neighboring pixel is directly used. Moreover, replacement/non-replacement of the pixel value is added as replacement information to the pixel value, and whether the pixel is a replaced pixel is determined based on the replacement information of the pixel value in calculating an interpolated pixel value and pixel compensation value. Thus, high-speed pipeline processing can be realized with a relatively simple circuit arrangement.

What is claimed is:

1. An image processing apparatus for generating new image data having pixel values having all color information for each interpolation point set on a two-dimensional plane, from original image data made up of many pixels which are arrayed in a matrix on the two-dimensional plane and each of which has only a pixel value representing a predetermined color information level obtained by an image sensor having individual color filters, comprising:

a replacement unit for, for a pixel value of a pixel that need not be replaced by another pixel value among pixel values contained in the original image data, adding replacement information representing non-replacement of the pixel value to the pixel value, and outputting the pixel value as replacement information-added image data, and for a pixel value of a pixel that needs to be replaced by another pixel value, replacing the pixel value by a predetermined pixel value, adding replacement information indicating replacement of the pixel value to the replaced pixel value, and outputting the pixel value as replacement information-added image data; and an interpolation unit for outputting interpolated pixel values having all color information by interpolating a pixel value at an interpolation point for each color information on the basis of a predetermined arithmetic expression from pixel values of pixels of the same color falling within a predetermined interpolation region containing the interpolation point among all replacement information-added image data output from said replacement unit, and when replacement information of any pixel used for calculation indicates replacement, using an arithmetic expression different from the arithmetic expression, wherein when target calculation pixels used to calculate the interpolated pixel value include a pixel whose replacement information indicates, an arithmetic expression is used, which has a reduced weight coefficient as compared to a normal arithmetic expression for calculating the interpolated pixel value, or has a weight coefficient of 0 for the pixel or a plurality of target calculation pixels including the pixel.

2. An image processing apparatus for generating new image data having pixel values having all color information for each interpolation point set on a two-dimensional plane, from original image data made up of many pixels which are arrayed in a matrix on the two-dimensional plane and each of which has only a pixel value representing a predetermined color information level obtained by an image sensor having individual color filters, comprising:

a replacement unit for, for a pixel value of a pixel that need not be replaced by another pixel value among pixel values contained in the original image data, adding replacement information representing non-replacement of the pixel value to the pixel value, and outputting the pixel value as replacement information-added image data, and for a pixel value of a pixel that needs to be replaced by another pixel value, replacing the pixel value by a predetermined pixel value, adding replacement information indicating replacement of the pixel value to the replaced pixel value, and outputting the pixel value as replacement information-added image data;

an interpolation unit for outputting interpolated pixel values having all color information by interpolating a pixel value at an interpolation point for each color information on the basis of a predetermined arithmetic expression from pixel values of pixels of the same color falling within a predetermined interpolation region containing the interpolation point among all replacement information-added image data output from said replacement unit, and when replacement information of any pixel used for calculation indicates replacement, using an arithmetic expression different from the arithmetic expression a compensation value calculation unit for calculating a pixel compensation value for compensating for a pixel value at the interpolation point based on a predetermined arithmetic expression from pixel values of a plurality of pixels which are positioned around the interpolation point and fall within a compensation region wider than and including the interpolation region, and when replacement information of any pixel used for calculation indicates replacement, calculating the pixel compensation value based on an arithmetic expression different from the arithmetic expression; and a compensation unit for compensating for the interpolated pixel value at the interpolation point output from said interpolation unit for each color information using the pixel compensation value at the interpolation point calculated by said compensation value calculation unit, and outputting the interpolated pixel value as a new pixel value having all color information at the interpolation point;

wherein when target calculation pixels used to calculate the pixel compensation value include a pixel whose replacement information indicates replacement, an arithmetic expression is used, which has a reduced weight coefficient as compared to a normal arithmetic expression for calculating the pixel compensation value, or has a weight coefficient of 0 for the pixel or a plurality of target calculation pixels including the pixel.

3. An image processing apparatus for generating new image data having pixel values having all color information for each interpolation point set on a two-dimensional plane, from original image data made up of many pixels which are arrayed in a matrix on the two-dimensional plane and each of which has only a pixel value representing a predetermined color information level obtained by an image sensor having individual color filters, comprising:

a replacement unit for, for a pixel value of a pixel that need not be replaced by another pixel value among pixel values contained in the original image data, adding replacement information representing non-replacement of the pixel value to the pixel value, and outputting the pixel value as replacement information-added image data, and for a pixel value of a pixel that needs to be replaced by another pixel value, replacing the pixel value by a predetermined pixel value, adding replacement information indicating replacement of the pixel value to the replaced pixel value, and outputting the pixel value as replacement information-added image data;

an interpolation unit for outputting interpolated pixel values having all color information by interpolating a pixel value at an interpolation point for each color information on the basis of a predetermined arithmetic expression from pixel values of pixels of the same color falling within a predetermined interpolation region containing the interpolation point among all replacement information-added image data output from said replacement unit, and when replacement information of any pixel used for calculation indicates replacement, using an arithmetic expression different from the arithmetic expression, a region value calculation unit for sequentially receiving pixel values forming the replacement information-added image data output from said replacement unit in parallel with each other by a predetermined number of pixel lines as pixel blocks for single pixel columns to form a sub-matrix from a predetermined number of pixel blocks received successively, calculating logical OR of replacement information and sums of pixel values of pixels included in respective regions set in advance on the sub-matrix as region values of the respective regions, and parallel-outputting the respective region values in synchronism with reception of the pixel block, and an interpolation unit selectively uses the respective region values parallel-output from said region value calculation unit to sequentially calculate, for each sub-matrix, interpolated pixel values at an interpolation point on a sub-matrix to be processed.

4. An image processing apparatus for generating new image data having pixel values having all color information for each interpolation point set on a two-dimensional plane, from original image data made up of many pixels which are arrayed in a matrix on the two-dimensional plane and each of which has only a pixel value representing a predetermined color information level obtained by an image sensor having individual color filters, comprising:

a replacement unit for, for a pixel value of a pixel that need not be replaced by another pixel value among pixel values contained in the original image data, adding replacement information representing non-replacement of the pixel value to the pixel value, and outputting the pixel value as replacement information-added image data, and for a pixel value of a pixel that needs to be replaced by another pixel value, replacing the pixel value by a predetermined pixel value, adding replacement information indicating replacement of the pixel value to the replaced pixel value, and outputting the pixel value as replacement information-added image data;

an interpolation unit for outputting interpolated pixel values having all color information by interpolating a pixel value at an interpolation point for each color information on the basis of a predetermined arithmetic expression from pixel values of pixels of the same color falling within a predetermined interpolation region containing the interpolation point among all replacement information-added image data output from said replacement unit, and when replacement information of any pixel used for calculation indicates replacement, using an arithmetic expression different from the arithmetic expression;

a compensation value calculation unit for calculating a pixel compensation value for compensating for a pixel value at the interpolation point based on a predetermined arithmetic expression from pixel values of a plurality of pixels which are positioned around the interpolation point and fall within a compensation region wider than and including the interpolation region, and when replacement information of any pixel used for calculation indicates replacement, calculating the pixel compensation value based on an arithmetic expression different from the arithmetic expression;

a compensation unit for compensating for the interpolated pixel value at the interpolation point output from said interpolation unit for each color information using the pixel compensation value at the interpolation point calculated by said compensation value calculation unit, and outputting the interpolated pixel value as a new pixel value having all color information at the interpolation point;

a region value calculation unit for sequentially receiving pixel values forming the replacement information-added image data output from said replacement unit in parallel with each other by a predetermined number of pixel lines as pixel blocks for single pixel columns to form a sub-matrix from a predetermined number of pixel blocks received successively, calculating logical OR of replacement information and sums of pixel values of pixels included in respective regions set in advance on the sub-matrix as region values of the respective regions, and parallel-outputting the respective region values in synchronism with reception of the pixel block;

an interpolation unit selectively uses the respective region values parallel-output from said region value calculation unit to sequentially calculate, for each sub-matrix, interpolated pixel values at an interpolation point on a sub-matrix to be processed; and a compensation value calculation unit selectively uses the respective region values parallel-output from said region value calculation unit to sequentially calculate, for each sub-matrix, a pixel compensation value at the interpolation point on the sub-matrix to be processed.

5. An image processing apparatus for generating new image data having pixel values having all color information for each interpolation point set on a two-dimensional plane, from original image data made up of many pixels which are arrayed in a matrix on the two-dimensional plane and each of which has only a pixel value representing a predetermined color information level obtained by an image sensor having individual color filters, comprising:

a replacement unit for, for a pixel value of a pixel that need not be replaced by another pixel value among pixel values contained in the original image data, adding replacement information representing non-replacement of the pixel value to the pixel value, and outputting the pixel value as replacement information-added image data, and for a pixel value of a pixel that needs to be replaced by another pixel value, replacing the pixel value by a predetermined pixel value, adding replacement information indicating replacement of the pixel value to the replaced pixel value, and outputting the pixel value as replacement information-added image data; and an interpolation unit for outputting interpolated pixel values having all color information by interpolating a pixel value at an interpolation point for each color information on the basis of a predetermined arithmetic expression from pixel values of pixels of the same color falling within a predetermined interpolation region containing the interpolation point among all replacement information-added image data output from said replacement unit, and when replacement information of any pixel used for calculation indicates replacement, using an arithmetic expression different from the arithmetic expression; and a defect information generation unit for using relative pixel position information with respect to an immediately preceding defective pixel position as information indicating a defective pixel position of the image sensor to determine whether each pixel forming the original image data is a defective pixel, and outputting a determination result as defect information to said replacement unit in synchronism with the each pixel, wherein said replacement unit determines whether to replace a pixel value on the basis of the defect information from said defect information generation unit in accordance with whether each pixel value included in the original image data corresponds to a defective pixel.

* * * * *